Nov. 3, 1964     P. C. SHERBURNE     3,155,051
TROLLEY HANGER
Filed Sept. 29, 1961     2 Sheets-Sheet 1
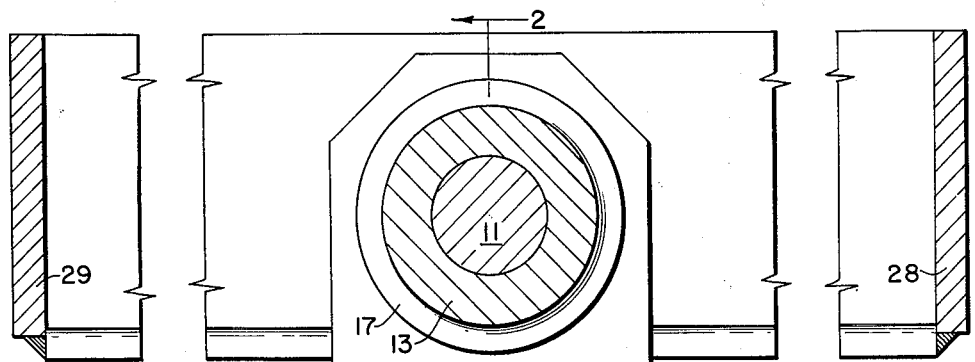
FIG. 1
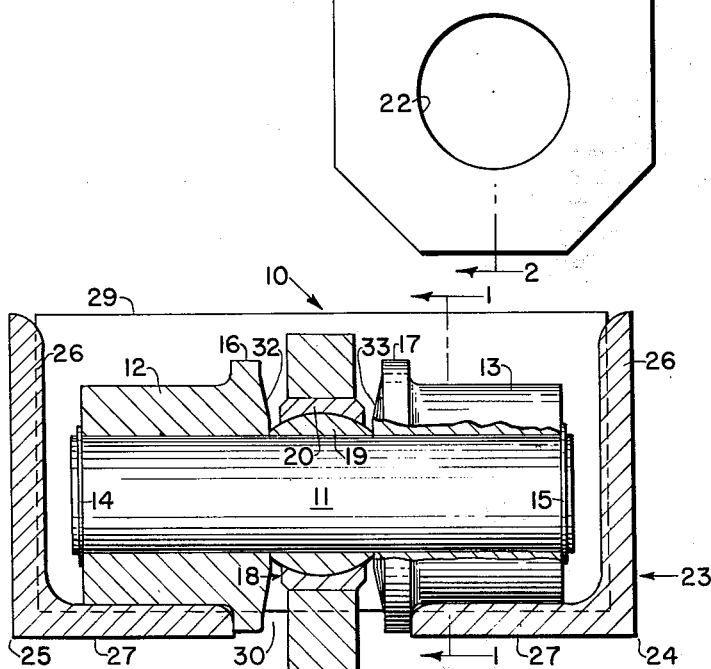
FIG. 2
INVENTOR.
PHILIP C. SHERBURNE
BY 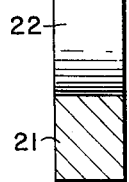
ATTORNEY Nov. 3, 1964 P. C. SHERBURNE 3,155,051
TROLLEY HANGER Filed Sept. 29, 1961 2 Sheets-Sheet 2

INVENTOR.
PHILIP C. SHERBURNE
BY *Martin D. Wittstein*

ATTORNEY

United States Patent Office 3,155,051
Patented Nov. 3, 1964

3,155,051
TROLLEY HANGER
Philip C. Sherburne, East Providence, R.I., assignor to Grinnell Corporation, Providence, R.I., a corporation of Delaware
Filed Sept. 29, 1961, Ser. No. 141,808
1 Claim. (Cl. 105—155)

This invention relates generally to improvements in trolley hangers for supporting pipe or the like in such manner as to accommodate horizontal movement of the pipe, and more particularly to a trolley hanger of the type mentioned wherein all horizontal relative movement between the pipe and a supporting structure is facilitated by a single bearing on the hanger.

As technology progresses, there are ever increasing needs for commercial piping installations which can withstand extremely high temperatures and pressures. As pipe is developed to meet these needs, so must supporting means for this pipe be developed which will meet certain requirements. One of these requirements is that the size and cost of building facilities necessary to house the aforementioned piping installations must be held to a minimum; this, of course, requires effective utilization of available space.

One way to effectively utilize such space is to install large industrial pipe in close proximity to ceilings, roofs, etc. However, a serious problem which arises in such installations is that the hangers used to support the pipe must be capable of accommodating horizontal movement of the pipe caused by thermal expansion thereof due to extremely high temperatures of the materials carried in the pipe. For example, a particular section of pipe being supported from a ceiling may move as much as several inches in the course of going from one end of the temperature range in which it operates to the other. If space were not a factor to be considered, and pipe hanger connecting rods could be as long as desired, this movement of the pipe would not be a serious problem. However, when the horizontal movement of the pipe is substantial in relation to the length of the hanger connecting rod, the result is a serious deflection of the rod from a vertical disposition, which can have undesirable effects on the hanger. For example, deleterious stresses might be created in the hanger which would cause injury or complete failure thereof. Further, if a spring hanger is interposed between the supporting structure and the pipe, a considerable error will be introduced into the hanger as a result of displacement from a vertical disposition of the hanger rod.

One very satisfactory solution to the above problem has been the trolley hanger which permits the point of attachment of the pipe hanger to the supporting structure to shift with movements in the pipe so that the hanger rod is always vertical, or at least substantially so. And even if the section of pipe in question does not move in a straight line, if the trackway upon which the trolley hanger moves is placed along the major axis of the direction in which the section of pipe moves, the trolley hanger will accommodate for some slight lateral movement of the pipe so that the section of pipe can move in an arc.

Conventionally, trolley hangers have been characterized by a carriage, and a trackway upon which the carriage moves. The carriage has consisted of a pair of axles with rollers mounted thereon, a body member, and a universal joint coupling means with load member suspended from the body to permit universal direction of movement of the load suspended therefrom. These devices were often cumbersome, inefficient and required frequent maintenance and repair.

The present invention seeks to overcome the deficiencies of the prior art trolley hangers by greatly reducing the number of components and moving parts involved in the device, thereby reducing wear and tear, lowering maintenance and replacement costs, and providing a simpler and more efficient hanger, and yet retaining all the functions and advantages of the prior art hangers. This is accomplished in the present invention by eliminating the body of the carriage and one axle, and by providing a universal joint coupling means in the form of a spherical bearing mounted centrally on one axle with a load member mounted on the spherical bearing. By this arrangement, the single spherical bearing performs the same functions that required as many as five or six bearings heretofore.

Accordingly, it is a primary object of the present invention to provide an improved trolley hanger for use in large industrial piping installations where economy of space is a salient factor.

It is another object of the present invention to provide an improved trolley hanger which will permit translation of the trolley hanger as a whole in one direction to accommodate for longitudinal movement of a section of pipe, and to permit, simultaneously therewith, displacement of the same section of pipe in a direction normal to the first direction of movement, resulting in a compound movement of the pipe section along a curved path.

It is yet another object of the present invention to provide an improved trolley hanger which will perform the above functions with fewer operating parts than devices heretofore known and with more efficiency and less maintenance.

It is yet another object of the present invention to provide an improved trolley hanger which suspends the load from a single spherical type bearing, this bearing serving the dual functions of permitting easy translation of the hanger and supporting the load for universal movement.

It is still another object of the present invention to provide an improved trolley hanger which is rugged in construction, economical to manufacture and simple to install and maintain.

Other objects and advantages of the present invention will become apparent from the detailed description which follows when considered in conjunction with the accompanying drawings.

In the drawings, in which the same reference numerals are used throughout the several views to indicate like parts:

FIGURE 1 is a side, partially sectional view of an illustrative embodiment of the present invention, taken along line 1—1 of FIG. 2;

FIGURE 2 is a sectional view taken along the line 2—2 of FIG. 1.

Figure 3:
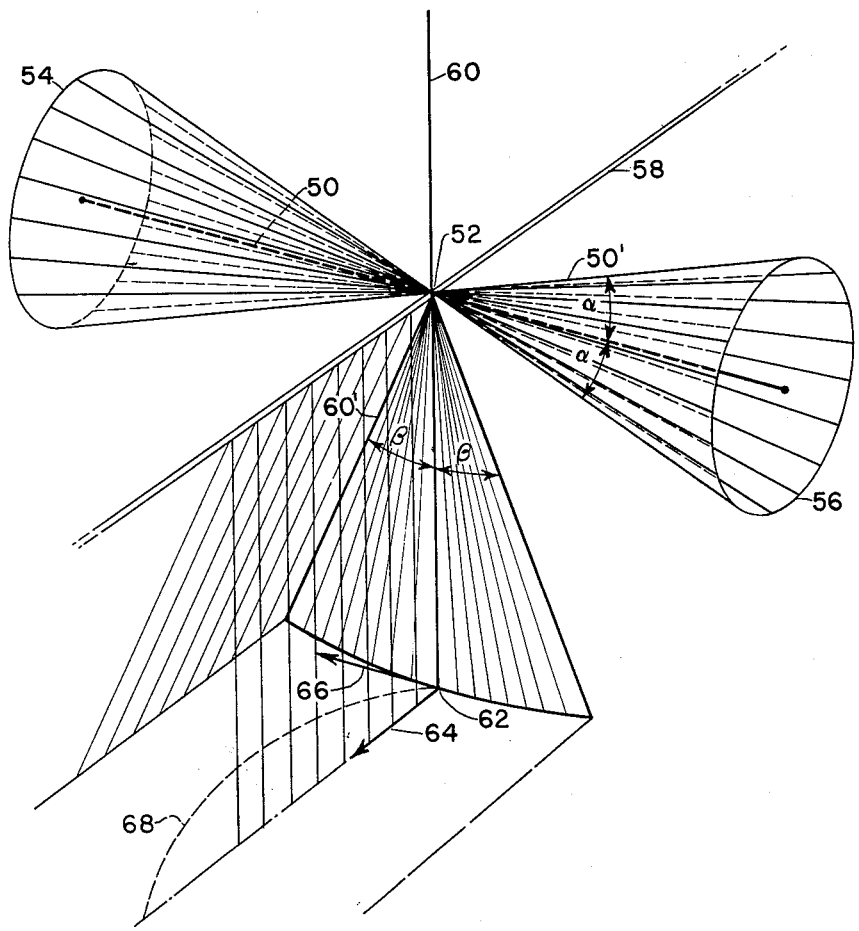
FIGURE 3 is a diagrammatic representation of the universal action of the spherical bearing support.

Referring now specifically to FIGS. 1 and 2, the numeral 10 designates generally a trolley hanger embodying the principles of this invention. The hanger consists of a single central shaft 11 having two identical rollers 12 and 13 mounted in non-rotatable fashion thereon. The rollers 12 and 13 are held on the shaft 11 by a pair of snap rings 14 and 15 respectively which fit into grooves formed in the shaft 11 adjacent to its ends. Each roller 12 and 13 has a peripheral flange 16 and 17 respectively adjacent one side thereof, the rollers being disposed on the shaft 11 with their respective flanges facing toward each other, but spaced apart from each other. The flanges and their function will be more fully described hereinafter.

Centrally mounted on the shaft 11 between the flanges 16 and 17 is a universal coupling means in the form of a spherical bearing generally designated 18. As used hereinafter, the phrase universal coupling means is intended to mean a joint or coupling between a body member and a support member which allows free movement in all directions, whether within certain limits or unlimited, between the aforementioned members. This bearing consists of an inner race 19 which is non-rotatable mounted on the shaft 11 and which fits into the space left between the aforementioned flanges, as seen in FIG. 2. The inner race 19 has a spherical outer bearing surface which mates with a correspondingly spherical inner bearing surface of an outer race 20, which is rotatable relative to the inner race. A load plate 21 having an opening therethrough is placed over the outer race 20 and is suspended therefrom in such manner that the load plate 21 and the outer race 20 can rotate relative to the inner race 19. The load plate 21 has means, here represented by the aperture 22, for supporting a load therefrom, such as a pipe clamp or other suitable means for supporting a section of pipe.

The structure described thus far, called a trolley assembly, is supported for movement by a split trackway generally designated 23, and seen in cross-section in FIG. 2 to comprise a pair of right angle shaped rail members 24 and 25, each rail member having a vertical side portion 26 and a horizontal bottom portion 27. The two rail members 24 and 25 are secured together at the ends thereof by end plates 28 and 29, as by welding or the like, to form a box-like structure running the full length of the bottom thereof. The entire trackway 23 is secured to a ceiling or other overhead structure by any convenient means.

The bottom portions 27 of the rail members 24 and 25 terminate apart from each other by a distance equal to the width of the inner race 19 of the spherical bearing 18 plus the thickness of the two flanges 16 and 17, thereby forming a longitudinal groove 30 which extends at least substantially the length of the trackway. Thus the load plate 21 has ample room in which to extend through the groove.

From the description thus far, it will be apparent that the device operates as follows: When the load plate 21 is inserted into the groove 30 from above and the rollers 12 and 13 rest upon the bottom portions 27 of the rail members 24 and 25, the trolley assembly is free to move back and forth along the trackway 23 from one end thereof to the other when a force is applied thereto. The rollers 12 and 13, the shaft 11 and the inner race 19 all rotate as a unit; the outer race 20 and load plate 21 remain rotationally stationary relative to the trackway 23. Thus, a load suspended from the load plate 21 is free to move along the axis of the trackway 23 within its limits without being disturbed from a vertical disposition.

Referring again to FIG. 2, it will be seen that the inner face of each roller 12 and 13 is provided with a frusto-conical portion 32 and 33 respectively, with the inner edge or face of each frusto-conical portion engaging a corresponding face of the inner race 19 of the spherical bearing 18. The inner race 19 is slightly wider than the outer race 20 so that the small gap is left between the sides of the outer race 20 and the corresponding inner faces of the frusto-conical portions 32 and 33. This gap permits the outer race 20 to oscillate back and forth on the inner race 19. The extent of oscillation of the outer race 20 is determined by the relationship of the parts as illustrated in FIG. 2, and can be varied by changing the size of the aforementioned gap. However, it should be kept in mind that the spherical bearing 18 is only a limited universal joint because of the practical limitations imposed by the necessity of capturing the inner race within the outer race. It would, therefore, be impossible from the design standpoints, to have the outer race oscillate to an unlimited extent.

The outer race 20 can rotate about an infinite number of axes within a limited range of axes. This range of axes is determined, as illustrated in FIG. 3, by selecting the longitudinal axis of the cylindrical section of the outer race 20, which is represented by the dotted line 50, and disposing such axis to a position such as that indicated at 50', which position is at the maximum possible angle, represented by $\alpha$ in FIG. 3, to the longitudinal axis of the shaft 11, this angle being established when one of the peripheral edges of the outer race 20 abuts the corresponding face of one of the frusto-conical portions 32 or 33, and then revolving the axis at position 50' about a pivot point 52 which is the intersection of the axis at position 50' with the longitudinal axis of the shaft 11 and is coincident with the geometric center of the spherical bearing 18, thereby generating a pair of oppositely facing cones 54 and 56 whose vertices are coincident with each other and with the aforementioned pivot point 52. The outer race 20 can rotate freely about any axis which lines within this pair of cones. As will be more fully explained hereinafter, the maximum angular deflection of the cone surface from the longitudinal axis of the shaft 11 also determines the maximum angular deflection $\beta$ of the load plate, the vertical axis of which is indicated at 60, from a vertical disposition.

Referring now to FIGS. 2 and 3, the complete operation of the device is as follows: Assuming that the load plate 21 is hanging vertically from the bearing 18, as represented in FIG. 3 by the vertical axis 60 of the load plate 21, and assuming that there is no lateral pull on the load plate so that the longitudinal axis of the cylindrical section of the outer race 20 at the position 50 is coincidental with the longitudinal axis of the shaft 11, the point of connection of the load with the load plate will be situated as represented by the point 62. This point of connection corresponds with the opening 22 of the load plate 21 as seen in FIG. 2 where the pipe which is being supported begins to move as the result of thermal expansion, a force is exerted on the load plate, this force being represented in direction by the arrow 64, in the general direction of the trackway 23 which is represented by the lines 58 in FIG. 3, assuming that the trackway has been placed parallel to the predominant direction of movement of the section of pipe being supported. This force will cause the entire trolley assembly to move along the trackway in accordance with the demands of the pipe. If, through error in calculation or other factor, a lateral force is exerted on the point of support in the direction of the arrow 66, the load plate 21 will swing to the side, and the longitudinal axis thereof will assume any of an infinite number of positions between the vertical, represented by line 60, and the line 60'. If the aforementioned forces are produced simultaneously, it will be seen that the point 62, representing the point of attachment of the load to the trolley assembly, will move in a curvilinear path, as represented by the dotted line 68, as a result of the compound motion caused by the simultaneously acting forces.

It should be noted that the load plate 21, in addition to the above described movements, is also free to oscillate about its own vertical axis 60 within the limits above described, so that the pipe may partake of a similar movement if the need arises. An advantageous feature of the spherical bearing construction is that by virtue of the cooperation between the roller flanges 16 and 17 and the inner faces of the bottom portion 27 of the rail members 24 and 25, no twisting action is imparted to the shaft 11. The flanges will cause the roller to follow a course that is parallel to the longitudinal axis of the trackway, and they will also prevent any lateral movement of the shaft and rollers, thereby preventing excessive wear on the sides of the trackway.

It will be apparent from the foregoing description that there has been provided a trolley hanger which is believed to provide a solution to the problems, and to fulfill the objections, hereinbefore set forth. It is to be understood, however, that the above description and accompanying drawings are to be deemed primarily illustrative of the best mode presently contemplated of carrying out the principles of the invention, and that the device described and illustrated may be modified or altered in its form, proportions, detail of construction and arrangement of parts without departing from the spirit and scope of the invention as defined in the appended claim.

What I claim and desire to secure by Letters Patent is:

A trolley hanger comprising:
(A) a split trackway adapted to be secured to an overhead surface, said trackway having:
(1) a pair of longitudinal rail members disposed adjacent one another,
(a) each member having a flat support surface,
(2) the two flat support surfaces being spaced apart and forming a groove between the facing edges thereof,
(B) an elongated shaft,
(C) a pair of rollers fixed one to each end of said shaft,
(1) each of said rollers resting on one each of said flat support surfaces of said rail members and having an enlarged inner flange,
(a) extending into said groove, and,
(b) engaging the facing edge of its respective support surface,
whereby said shaft and rollers are constrained against lateral or twisting movement relative to said trackway,
(c) and having frustro-conical inner faces to form limiting surfaces,
(D) a first inner bearing race fixedly joined to said shaft between said inner flanges
(1) said first race having a spherical outer surface configuration of wide portions removed for fixed abutting retention between said two flanges,
(E) a second outer bearing race about said first race, having an inner annular surface conforming to the sperical configuration of said first race, and being rotatably moveable about said first race,
(1) said second race being narrower than said first race and thereby being free to rotate within the limits of said inner faces of said rollers,
(F) a load supporting member joined to and depending from said second race member,
(1) said member being narrower, measured parallel to said shaft, than said second race, and
(2) being independent of restraining members other than the load,
whereby said load supporting member may be moved longitudinally along said trackway, may be freely swung laterally on said first race about any horizontal axis within the limits of said inner flange faces, and may be rotated freely about its vertical longitudinal axis within the limits of said inner flange faces.

References Cited in the file of this patent

UNITED STATES PATENTS

| | | |
|---|---|---|
| 842,457 | Harding | Jan. 29, 1907 |
| 1,053,399 | Jacobs | Feb. 18, 1913 |
| 1,389,002 | Houston | Aug. 30, 1921 |
| 1,733,845 | Welser | Oct. 29, 1929 |
| 2,597,224 | Charron et al. | May 20, 1952 |

FOREIGN PATENTS

| | | |
|---|---|---|
| 841,710 | Germany | June 23, 1952 |
| 846,607 | Germany | Aug. 14, 1952 |

UNITED STATES PATENT OFFICE
CERTIFICATE OF CORRECTION

Patent No. 3,155,051                                        November 3, 1964

Philip C. Sherburne

It is hereby certified that error appears in the above numbered patent requiring correction and that the said Letters Patent should read as corrected below.

Column 5, line 33, for "flanges" read -- flanges, --; line 35, for "configuration of wide portions" read -- configuration with side portions --.

Signed and sealed this 6th day of July 1965.

SEAL)
Attest:

ERNEST W. SWIDER                                     EDWARD J. BRENNER
Attesting Officer                                         Commissioner of Patents